US010893058B1

(12) United States Patent
Casaburi et al.

(10) Patent No.: US 10,893,058 B1
(45) Date of Patent: Jan. 12, 2021

(54) MALWARE DETECTION AND ALERTING FOR NETWORK CONNECTED DEVICES BASED ON TRAFFIC FLOW ANALYSIS ON LOCAL NETWORK

(71) Applicant: NortonLifeLock Inc., Tempe, AZ (US)

(72) Inventors: Jim Casaburi, Rancho Palos Verdes, CA (US); Steven P. Stockman, Plattsmouth, NE (US)

(73) Assignee: NORTONLIFELOCK, INC., Tempe, AZ (US)

( * ) Notice: Subject to any disclaimer, the term of this patent is extended or adjusted under 35 U.S.C. 154(b) by 411 days.

(21) Appl. No.: 14/575,759

(22) Filed: Dec. 18, 2014

(51) Int. Cl.
*H04L 29/06* (2006.01)

(52) U.S. Cl.
CPC .......... *H04L 63/1408* (2013.01); *H04L 63/14* (2013.01)

(58) Field of Classification Search
CPC .................... H04L 63/1408; H04L 63/145
USPC ........................................................ 726/23
See application file for complete search history.

(56) References Cited

U.S. PATENT DOCUMENTS

| 8,578,491 | B2 * | 11/2013 | McNamee | H04L 12/2602 |
| | | | | 709/223 |
| 9,485,262 | B1 * | 11/2016 | Kahn | H04L 63/1416 |
| 2007/0011317 | A1 * | 1/2007 | Brandyburg | H04L 43/026 |
| | | | | 709/224 |
| 2007/0143847 | A1 * | 6/2007 | Kraemer | G06F 21/554 |
| | | | | 726/23 |
| 2007/0256127 | A1 * | 11/2007 | Kraemer | G06F 21/552 |
| | | | | 726/23 |
| 2011/0126259 | A1 * | 5/2011 | Krishnamurthi | H04L 43/026 |
| | | | | 726/1 |
| 2014/0195793 | A1 * | 7/2014 | Lindteigen | H04L 63/123 |
| | | | | 713/100 |
| 2015/0372980 | A1 * | 12/2015 | Eyada | H04L 63/1416 |
| | | | | 726/1 |
| 2016/0021014 | A1 * | 1/2016 | Wetterwald | H04L 47/2441 |
| | | | | 370/235 |

OTHER PUBLICATIONS

Kaur, "A Survey on Zero-Day Polymorphic Worm Detection Techniques", Aug. 19, 2014, IEEE, pp. 1520-1549 (Year: 2014).*
Comodo, "Free Anti-Malware BOClean," https://www.comodo.com/home/internet-security/anti-malware.php, 4 pages.
Malwarebytes, Anti-Malware Premium, https://www.malarebytes.com/free/, 5 pages.
Yen, Ting-Fang, "Detecting Stealthy Malware Using Behavioral Features in Network Traffic," Dept. of Electrical and Computer Engineering, Carnegie Mellon University, Aug. 2011, 123 pages.

(Continued)

*Primary Examiner* — Alexander Lagor
*Assistant Examiner* — Gregory A Lane
(74) *Attorney, Agent, or Firm* — FisherBroyles, LLP

(57) ABSTRACT

As described, embodiments presented herein provide techniques for detecting malware on computing devices connected to a local network segment by observing the traffic flows of such devices and generating signatures characterizing such traffic flows. Doing so allows instances of malware to be detected on a variety of devices which can be connected to a computing network, but which lack the capability of directly detecting and preventing malware applications from infecting such devices.

20 Claims, 6 Drawing Sheets

(56) References Cited

OTHER PUBLICATIONS

RedSocks Security—Malicious Threat Detection Solutions, "360° Visibility in Security, Detect Data Breaches in Real-Time," https://www..redsocks.eu/#home, 3 pages.

Microsoft, Malicious Software Removal Tool from Official Microsoft Download Center, https://www.microsoft.com/en-us/download/malicious-software-removal-tool-details.aspx, 6 pages.

Reick, Konrad et al., "Botzilla: Detecting the "Phoning Home" of Malicious Software," SAC'10 Mar. 22-26, 2010, Sierre, Switzerland, 7 pages.

* cited by examiner

MALWARE DETECTION AND ALERTING FOR NETWORK CONNECTED DEVICES BASED ON TRAFFIC FLOW ANALYSIS ON LOCAL NETWORK

BACKGROUND

Field

Embodiments of the invention generally relate to techniques for detecting malware on network devices. More specifically, embodiments presented herein provide techniques for evaluating network traffic to identify malware on computing devices which do not (or in some cases cannot) have malware protection enabled or which otherwise lack malware protection capabilities.

Description of the Related Art

"Malware" generally refers to malicious software applications configured to disrupt computer operation, gather sensitive information, or gain unauthorized access or control of a computing system or device. While the effect of malware can be relatively benign, malware is increasingly used to gather private information (e.g., banking credentials) or to take control of computing systems. Further, while malware has typically been directed at conventional computing systems (e.g., desktop and laptop systems running versions of the Windows® operating system), the dramatic rise of mobile telephones and tablets has expanded the systems targeted by malware. For example, mobile telephones and tablets provide considerable computing power and network connectivity. Further, the widespread use of online application marketplaces to distribute software (commonly referred to as "apps") has come to provide a significant vector for distributing malware to mobile devices. Once installed, such malware can exploit vulnerabilities to gain control of a device, capture sensitive information, (e.g., banking app usernames and passwords). Similarly, malware apps can be distributed as legitimate applications, and rely on "social engineering" to trick individuals into installing, using, and providing information. Further still, network capabilities are being integrated into more and more devices, e.g., gaming consoles, cable set-top boxes, televisions, home automation controllers, streaming devices, and other devices or embedded systems.

This proliferation of internet-connected devices has significantly increased the number of attack vectors targeted by malware authors. At the same time, conventional anti-malware technologies are frequently unable to protect these devices directly. That is, for many of these devices it is impossible or at least infeasible to install and run anti-malware applications. For example, many of these devices limit third-party applications (i.e., "apps") to running in a "sandboxed" environment. This restriction prevents conventional malware application from detecting malware on a device outside of the "sandbox." Similarly, some devices with embedded network capabilities may simply not support the installation and execution of malware protection applications.

SUMMARY

One embodiment presented herein includes a method for detecting a presence of a malware application on a computing device. This method may generally include identifying at least a first computing device present on a local network segment of a computing network. The first computing device may be associated with a device type known to not provide malware detection capabilities. This method may also include monitoring, on the local network segment, at least a first traffic flow associated with the first computing device and generating, from the first traffic flow, a signature characterizing the first traffic flow. This method may also include determining, based on the signature, whether the malware application is predicted to be present on the first computing device.

For example, in a particular embodiment, the generated signature is compared to a plurality of malware signatures. In such a case, the comparison may provide a measure of how strongly the generated signature matches a traffic flow (or cluster of flows) which indicate the presence of malware. In a particular embodiment, the signature is compared to a local database of malware signatures on a routing device managing the first traffic flow. Alternatively, the signature is generated on a routing device managing the first traffic flow, but sent by the routing device to an external network security service. Further, if the malware application is predicted to be present on the computing device, then an alert may be generated indicating the predicted presence of the malware application on the first computing device. Further still, in some cases, network traffic associated with the first network flow may be dropped or blocked until the predicted presence of malware is investigated or resolved.

Still another embodiment includes a computer-readable storage medium storing instructions, which, when executed on a processor, performs an operation for detecting a presence of a malware application on a computing device. This operation may generally include identifying at least a first computing device present on a local network segment of a computing network. The first computing device may be associated with a device type determined to not provide malware detection capabilities. The operation may also include monitoring, on the local network segment, at least a first traffic flow associated with the first computing device and generating, from the first traffic flow, a signature characterizing the first traffic flow. This operation may further include determining, based on the signature, whether the malware application is predicted to be present on the first computing device.

Still another embodiment includes a system having a processor and a memory a memory hosting a malware detection component, which, when executed on the processor, performs an operation for detecting a presence of a malware application on a computing device. This operation may generally include identifying at least a first computing device present on a local network segment of a computing network. The first computing device may be associated with a device type determined to not provide malware detection capabilities. The operation may also include monitoring, on the local network segment, at least a first traffic flow associated with the first computing device and generating, from the first traffic flow, a signature characterizing the first traffic flow. This operation may further include determining, based on the signature, whether the malware application is predicted to be present on the first computing device.

BRIEF DESCRIPTION OF THE DRAWINGS

So that the manner in which the aspects recited above are attained and can be understood in detail, a more particular description of embodiments of the invention, briefly summarized above, may be had by reference to the appended drawings.

DETAILED DESCRIPTION

Figure 1:
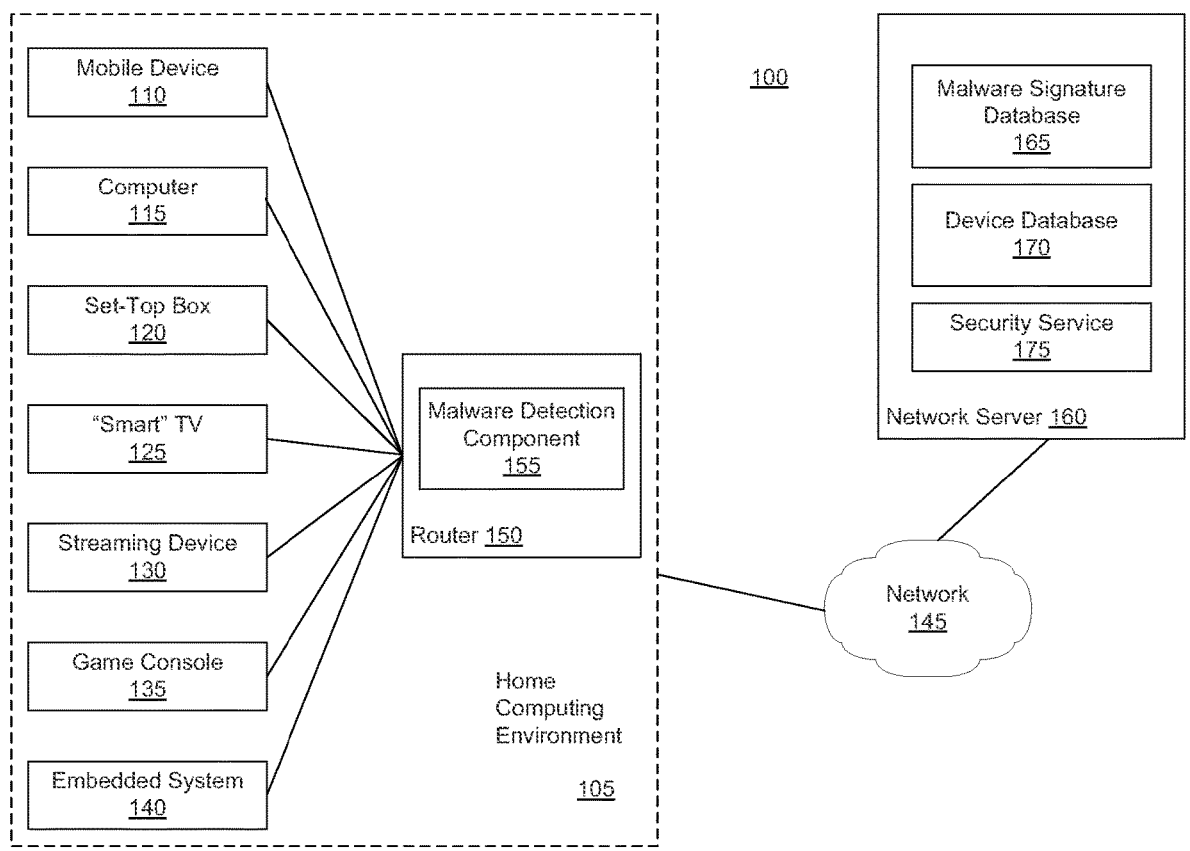
FIG. 1 illustrates an example of a computing environment, according to one embodiment.

Embodiments presented herein provide techniques for detecting malware on a variety of computing devices connected to a network. More specifically, embodiments presented herein provide techniques for identifying malware on devices connected to a network, where the device does not (or in some cases cannot) have malware protection enabled or which otherwise lacks malware protection capabilities, e.g., embedded and sandboxed devices.

In one embodiment, a malware detection component on a computing connected to a network device observes traffic flows across that network, observes traffic to and from each local device, paying attention to devices that are not known to be secure. For such devices, the malware detection component analyzes the corresponding traffic flows to assess whether the device may be compromised by malware. To do so, the malware detection component signatures generated from the observed traffic flows against malware signatures stored in a local database. Alternatively, the malware detection component may send signatures to a network service and receive a response indicating whether the signature matched a known (or suspected) signature. If so, the malware detection component may notify an end user or administrator about the potential threat, e.g., via email, text message, phone call, etc. Further, the malware detection component could also cause the network connectivity of the device to be disabled.

In one embodiment, the malware detection component could be part of a network router or combined router and modem (e.g., a DSL or cable modem). The malware detection component could also be part of a separate network security device attached to a home network that remains on at all times. Another device that could host the malware detection component includes a network attached storage (NAS) system configured to monitor traffic flows on a local network segment. Similarly, a network interface card (NICs) on a home computer could—in what is sometimes referred to as "promiscuous-mode"—provide traffic from a local network segment to the malware detection component. In one embodiment, the malware detection component identifies a set of devices attached to a local network segment and attempts to determine a device type or security status of each one. For example, some devices may advertise their presence on a local network and identify a device type. In other cases, network traffic flows initiated by a given device may be used to identify a device type. In other cases, the malware detection component could query or probe a device to see if a service is installed or available on that device, (e.g., to determine whether a malware detection application or firewall service is installed). Devices identified by the malware detection component may be compared against a database of known secured devices. For example, a home computer with a property installed an up-to-date malware protection application may be identified as being secure in a database managed by a vendor of the malware protection application installed on the home computer. Similarly, some devices may be "white listed" as having no known (or suspected) malware signatures. Also, the component may poll online licensing databases, e.g., based on an external IP address of a home network, to identify known installations of protected devices using that external IP address and local subnet segment.

Traffic flows of devices for which a device type is not identified or which are not considered secure are monitored by the malware detection component. For example, information monitored from each traffic flow may include MAC addresses, source and destination IP address, destination MAC address, and data payload sizes. Additional information can include traffic frequency, time stamps, and potentially data payloads. However, monitoring payloads may be of limited use, particularly, where payload headers indicate that a payload is encrypted. In one embodiment, the malware detection component builds a statistical model of a traffic flow, i.e., a signature, and compares it to signatures in a database of signatures generated from traffic flows of known and suspected malware infections. The signature of a given traffic flow can be generated whenever a new traffic flow is originated on a local network, periodically at specified intervals, or over a sliding window based on time or traffic amounts, or using other approaches.

Signatures generated from local network traffic flows are compared against malware signatures to detect new threats as they appear and alert users. The signature database comparison can occur on the device hosting the malware detection component or an online server. In either case, the flow may be recorded and used for future comparisons. Furthermore, the signature for the analysis is added to the database to improve the data set. In one embodiment, when a malware infection is detected (or suspected) an alert may be sent to a user, as specified in a device configuration on the host device such as a email, text messages, or messages presented via security applications on the host device. Similarly, alerts may be sent to an online service and users could be contacted by a support specialist or automated service. The alerts may include network information such as a MAC an/or IP address of the suspected device and any other information known about the device as well as identify the suspected infection. In one embodiment, if the host device is capable of preventing the network communication to/from the suspected device (as in the case of a gateway, wireless access point, or internet router) then the host device could be configured to block network traffic to/from the until the suspected malware infection was resolved.

Note, embodiments of the invention are described below using a network router configured with a malware detection component as an example of a host device for the malware detection component. One of ordinary skill in the art will recognize that embodiments of the malware detection component described herein may be adapted to work with a variety of computing devices. For example, the malware detection component may be integrated with network storage devices, embedded or integrated with a security device or appliance, as well as run as an application on a computing system. Similarly, while described below with reference to a router used in a home networking environment, embodiments may be used in other contexts. For example, the malware detection component could be used to evaluate traffic flows in an enterprise computing network, particularly for enterprise networks which grant access to computing systems, smartphones tablets, etc., not owned or controlled by the enterprise (e.g., employees' laptops, smartphones, tablets, etc.)

FIG. 1 illustrates an example of a computing environment, according to one embodiment. As shown, the computing environment 100 includes home computing environment 105 connecting a household to a network 145 (e.g., the internet), and a network server 160 hosting components of a security service.

Illustratively, the home computing environment 105 includes a router 150 and a malware detection component 155. The router 135 may provide a local network segment that includes both wired and wireless connections between the router 135 and a variety of connected devices. For example, as shown, the home networking environment 105 includes a mobile device 110, e.g., smartphone or tablet, a personal computer 115, a set-top box 120, a "smart" TV, a video streaming device 130, and a gaming console 135. In addition, home computing environment 105 includes an embedded system 140 generally includes any other device capable of communicating over computer networks that could become a malware target, e.g., consumer products such as thermostats, appliances, home automation systems, etc., which include a network interface—sometimes referred to as "the internet of things."

Each of the devices 110-140 may be configured to establish a network connection with the router 150, allowing traffic flows to/from these devices to be established. Further, each of the devices 110-140 may be the target of some form of malware configured to compromise the functionality of a given device, collect data from that device, override, redirect, or misuse the capabilities of the device, etc.

In one embodiment, the malware detection component 155 may be configured to monitor traffic flows associated with one or more of the devices 110-140. For example, the malware detection component 155 may identify a device ID or device type associated with a given device and determine whether it is known (or at least currently presumed) to be secure. For example, assume a current and up to date malware detection application has been installed and configured on PC 115. In such case, the malware detection component 155 could use an ID associated with PC 115 (e.g., an ID provided by the malware detection application) to identify the PC 115 in device database 170 hosted on network server 160. As another example, assume streaming device 130 allows users to install "apps" that run in a sandboxed environment. In such a case, the malware detection component 155 could identify a device-type using a variety of network discovery protocols (e.g., bonjour). Further, the streaming device 130 may not support a malware detection application and become vulnerable to malware. In one embodiment, the malware detection component 155 could monitor traffic flows of the streaming device 130 but not traffic flows of the PC 115.

Similarly, assume the "smart" TV supports some "apps" (e.g., streaming services and social media) but is not known to be the target of any known or suspected malware. In such a case, the malware detection component 155 could elect to not monitor traffic flows associated with the smart TV 125, as no malware signatures would be available to compare with signatures generated from such flows. Further, assume the mobile device 110 supports third party apps but also is known to include effective malware detection components. In such a case, the malware detection component 155 could elect to not monitor traffic flows associated with the mobile device 110. For example, the mobile device 110 could be "white-listed" in the device database 170. Note, in addition to monitoring traffic flows of devices 110-140, based on the characteristics of a given device, the malware detection component could be configured to monitor traffic flows for devices as specified in configuration data on the router 150.

Network traffic flows may also occur between the devices 110-140. That is, some traffic flows might not interact with networks outside of the home computing environment 105. While some such flows are likely to be legitimate, e.g., in cases where content from a mobile device 110 is sent to streaming device 130 or to smart TV 125. In other cases, traffic flows among devices 110-140 could be the result of malware doing network discovery to attempt to find other vulnerable devices in the home computing environment 105. In such cases, the malware detection component 155 may monitor and evaluate such flows in order to detect malware attempting to infect other systems in real-time, and in some cases, stop malware on one system from infecting others.

The server system 160 is included to be representative of a physical computing system, as well as representative of virtual machine instances deployed to a computing cloud. As shown, the server system 160 includes a malware signature database 165, a device database 170, and a security service 175. The network server 160 may be configured with variety of web-server applications (e.g., apache or nginix) database systems and application servers configured to communicate with client systems using HTTP/HTTPS and related protocols.

The device database 170 generally stores information specifying whether a given device (or device type) is known (or at least presumed) to be secure against malware. As noted above, e.g., the device database 170 may identify specific devices by a unique identifier. The ID itself may be generated using a variety of approaches, e.g., a hash of a MAC address on a network interface computing device, or an identifier assigned to a device by a manufacturer, or generated by an application on that device, etc. In other cases, the device database 170 may specify whether a given device type or class should (or should not) be considered to be secure against malware.

In one embodiment, the malware signature database 165 provides a collection of signatures generated from (or at least representative of) traffic flows expected to be observed for computing devices that have been compromised by a known (or suspected) malware application, computer virus, etc. The malware signatures in malware signature database 165 may be compared against signatures generated by the traffic flows of devices 110-140 in the home computing environment 105, i.e., on signatures generated from traffic flows on the local network segment between the router 150 and one of the devices 110-140. For example, in one embodiment, the malware detection component 155 may store a set of signatures based on to the particular set of computing devices present in the home computing environment 105. The malware detection component 155 then compares the relevant malware signatures for a given device to signatures generated from the network traffic flows of that device. Alternatively, the malware detection component 155 could generate a signature for a given device and traffic flow and send that signature to a security service 175 hosted on the network server 160. In response, the security service 175 compares that signature to the malware signature database 165 and sends a message back to the malware detection component 155 indicating whether the signature matched a signature assigned with a known (or suspected) malware application. As discussed below, the malware detection component (or security service) may use predictive modeling or statistical learning techniques to evaluate a signature generated for a given traffic flow.

Figure 2:
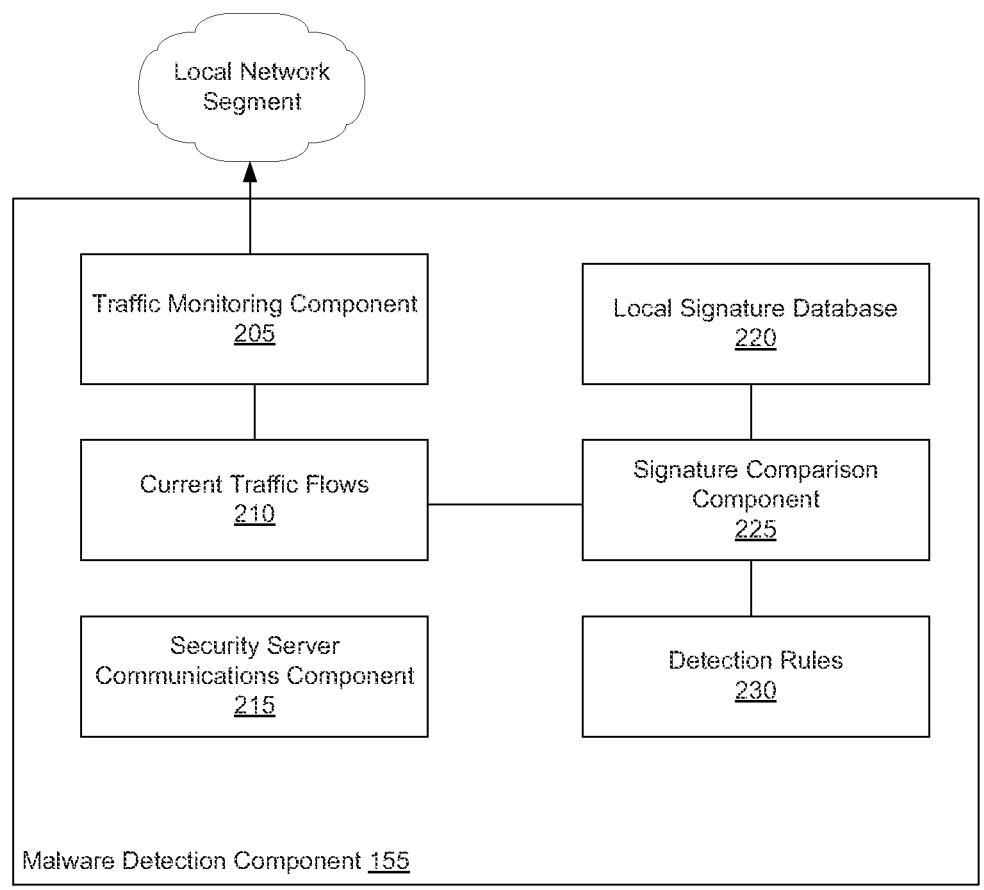
FIG. 2 illustrates an example malware detection component, according to one embodiment.

FIG. 2 further illustrates the malware detection component 155, according to one embodiment. As shown, the malware detection component 155 includes a traffic-monitoring component 205, current traffic flows 210, security server communications component 215, local signature database 220, signature comparison component 225, and detection rules 230.

In one embodiment, the traffic-monitoring component 205 is configured to observe and record traffic flows for given devices on a local network segment (e.g., one or more of the devices 110-140 shown in FIG. 1). Such traffic flows may be stored by the malware detection component 155 in current traffic flows 210. For example, when integrated with a network router, the current traffic flows 210 could be stored in a local memory storage on the router. As noted above, information recorded for a traffic flow 210 may include MAC addresses, source and destination IP address, destination MAC address, and data payload sizes associated with that traffic flow. Additional information can include traffic frequency, time stamps, and potentially data payloads. The malware detection component 155 may use these (along with other) features of a traffic flow to generate a statistical signature of that traffic flow. Once the information needed to generate a given signature definition has been recorded in the current traffic flows 210, the traffic-monitoring component 205 generates a signature representing that traffic flow.

Once generated, the signature comparison component 225 compares that signature with signatures representing traffic flows of known (or suspected) malware applications to predict whether a malware application is present on the computing device. In one embodiment, the comparison component 225 compares the generated signature with signatures stored in the local signature database 220. As noted, signature database 220 may be updated based on the devices present in a local network segment, as well as when new malware signatures become available. Alternatively, the communications component 215 may send a signature generated by the traffic-monitoring component 205 to a security service for evaluation. In either case, the comparison component 215 (or security service) may compare the generated signature to a model of known good and bad signatures and determine whether to classify the generated signature as being indicative of malware. To do, the comparison component 215 (or security service) may use any suitable machine learning or modeling techniques to classify or score the signature as being indicative of malware, including, e.g., a Bayes classifier, adaptive resonance theory (ART) networks, or self-organizing maps, etc. Thus, the comparison may provide a measure of how much a given signature "looks like" signatures generated by a given malware component. Thus, a generated signature that is a close percentage match to a cluster of malware (or highly scored by the model) may be used as an indication of the presence of malware on a given device. Such a measure may also include a confidence measure in the how well the model was able to classify the generated input. Note, the measure of how closely a traffic flow needs to match (or thresholds for scores of either percentage matches or confidence) may be tailored based on preferences and experience.

In the event a signature generated by the traffic-monitoring component 205 is determined to match a known (or suspected) malware signature in local signature database 220, or a response received by the communications component 215 indicates the presence of malware on a given device, then the malware detection component 155 may invoke a remedial action. For example, the detection rules 230 may specify that once a device is suspected of being compromised by malware (based on a traffic flow signature matching a malware signature), network traffic to/from that device should be dropped. Similarly, the detection rules 230 could specify what alerts should be generated and how such alerts should be communicated. For example, the detection rules 230 could specify an email address or text message to send alerts of suspected malware infections. Of course, the detection rules could specify a variety of other actions to take when a suspected malware infection occurs.

Further, the detection rules 230 could also specify a variety of configuration information used by the malware detection component 155. For example, the detection rules could specify what devices (or device types, classes, or versions) should be monitored by the traffic-monitoring component 205, when signatures should be generated for traffic flows (e.g., each time a new traffic flow is originated), a URL of a security service (and user credentials) used by the communications component 215 to access the security service, whether the malware detection component should maintain local signature database 220 or rely on the security service to evaluate a given traffic flow signature, etc.

Figure 3:
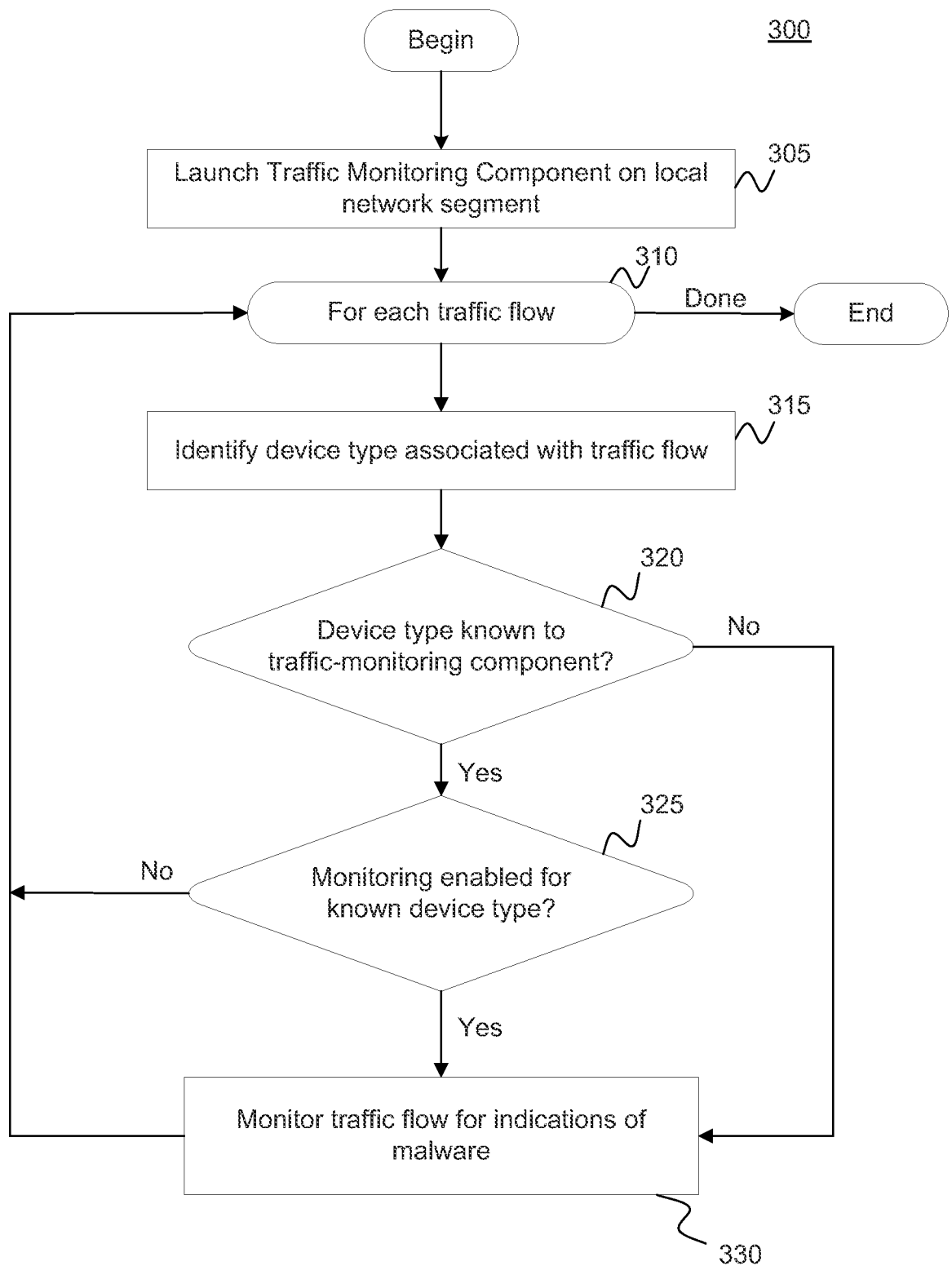
FIG. 3 illustrates a method for identifying computing devices on a local network segment to monitor for malware, according to one embodiment.

FIG. 3 illustrates a method 300 for identifying computing devices on a local network segment to monitor for malware, according to one embodiment. As shown, the method 300 begins at step 305, where the malware detection component launches the traffic-monitoring component. At step 310, the monitoring component observes a set of traffic flows present in the local network segment, as well as identifies new traffic flows as they are established.

After identifying the current traffic flow (or as new flows are established), a loop begins to determine which traffic flows should be monitored by the malware detection component. At step 315, the traffic-monitoring component identifies a device type or class (or device ID) of a computing device associated with one of the traffic flows observed at step 310. At step 320, if the device type associated with the traffic flow under consideration cannot be determined, then the malware detection component may begin monitoring that traffic flow (and other flows on that device). Otherwise, for known device types, the malware detection component determines whether to monitor the traffic flow under consideration (step 325) based on the identified device type. For example, if a traffic flow under consideration is associated with a device type (or specific computing device) known (or presumed) to be secure, the malware detection component may decide to not monitor the traffic flow under consideration. Similarly, if no malware signatures are available for given device type or class, then the malware detection component may decide to skip monitoring the traffic flow. In one embodiment, however, the malware detection comment may evaluate such traffic flows despite a lack of known malware vulnerabilities. Doing so may help identify a "port" of a known malware application targeting one device type to another device or identify new malware variants that communicate with known IP addresses, networks, or systems. Further, the malware detection component may also test traffic flows for devices believed to be secure, retest any of the traffic flows, and randomly select traffic flows to evaluate (or reevaluate), etc.

At step 325, if the identified device type is known to lack direct malware protection capabilities, then at step 330, the malware detection component may decide to monitor the traffic flow under consideration (and other traffic flows on the associated device). Following step 325 or 330, if additional (or new) traffic flows remain to be evaluated, then malware detection component selects the next traffic flow to evaluate in the loop beginning at step 315, until all traffic flows observed at step 310 have been evaluated.

Figure 4:
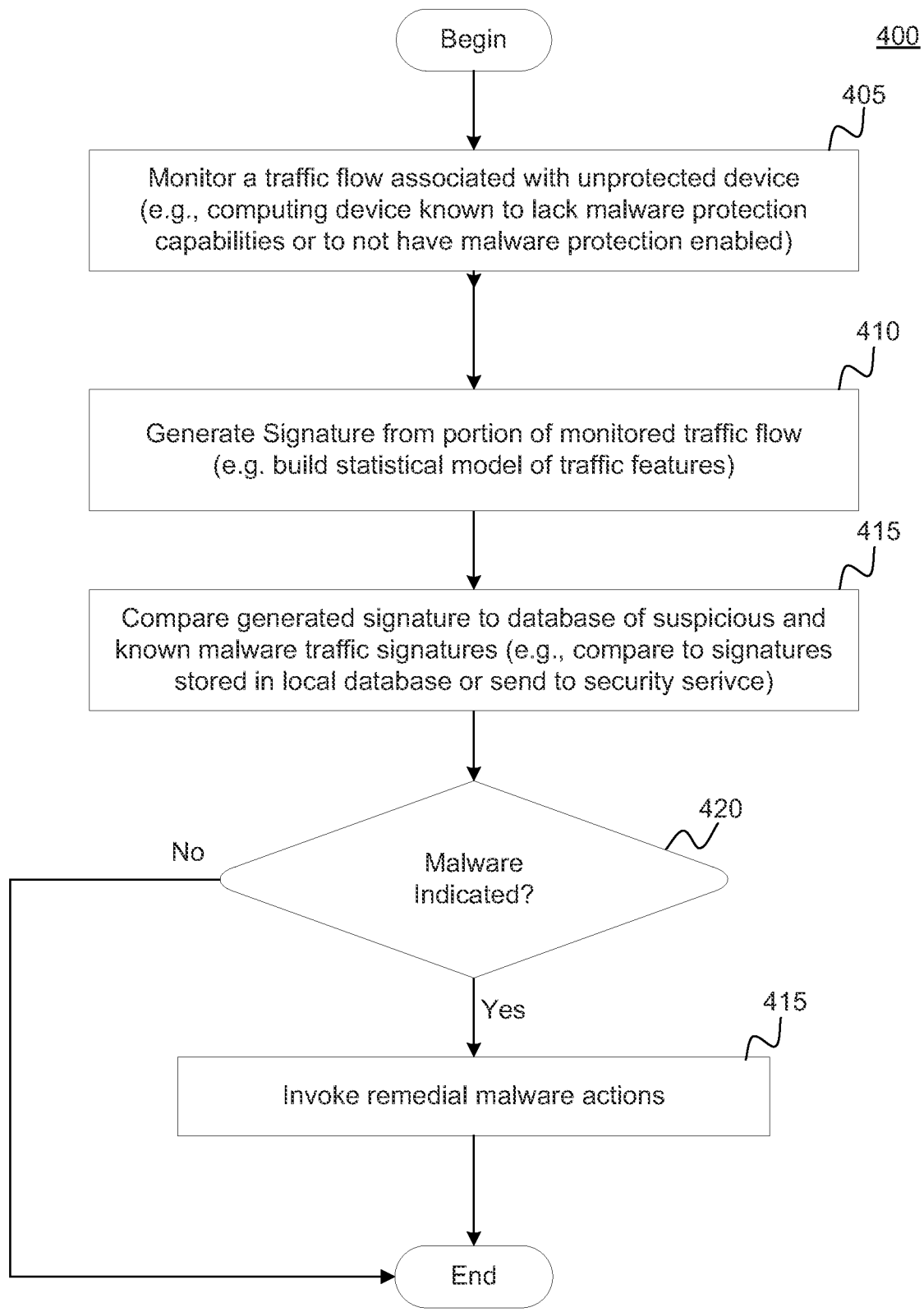
FIG. 4 illustrates a method for detecting malware on a computing device, according to one embodiment.

FIG. 4 illustrates a method 400 for detecting malware on a computing device, according to one embodiment. As shown, the method 400 begins at step 405, where the malware detection component observes a traffic flow to/from a computing device on a local network segment. As noted, the computing device may have been determined as being a member of a device type or class known to not have malware protection capabilities. At step 410, the malware detection component generates a signature from a portion of the network traffic flow observed at step 405. As noted above, depending on the information needed to generates a particular signature, the information captured for the traffic flow may include MAC addresses, source and destination IP address, destination MAC address, and data payload sizes associated with that traffic flow. Additional information can include traffic frequency, time stamps, and potentially data payloads.

At step 415, the malware detection component compares the signature generated at step 410 to a database of malware signatures to predict a presence of malware on the computing device. As noted, in one embodiment, the malware detection component compares the signature to a local database of malware signatures. Alternatively, the detection component may send the signature to a security service to be evaluated. In either case, if the signature generated at step 410 matches a malware signature, then the device associated with the traffic flow may be determined, based on the signature, that the malware application is predicted to be present on computing device under consideration.

At step 420, if the presence of malware is predicted, based on the traffic flow signature matching a known (or suspected) malware signature, then the malware detection component may invoke a remedial action. For example, the malware detection component could generate an alert to notify owners or users of the computing device indicating that the device may have been compromised by a malware application. Similarly, when the malware detection component is installed on a network routing device connecting a local network segment, then the malware detection component may cause network traffic to/from that device to be dropped. That is, the traffic flows on that device may be blocked. Otherwise, if the signature generated from the traffic flow does not match any of signatures associated with known (or suspected) malware traffic flows, then the malware detection component takes no action. However, in one embodiment, the signature generated for traffic flows of a given device type may be sent to a security service. For example, doing so may help generate or revise malware signatures for a given malware application or for that device type.

Figure 5:
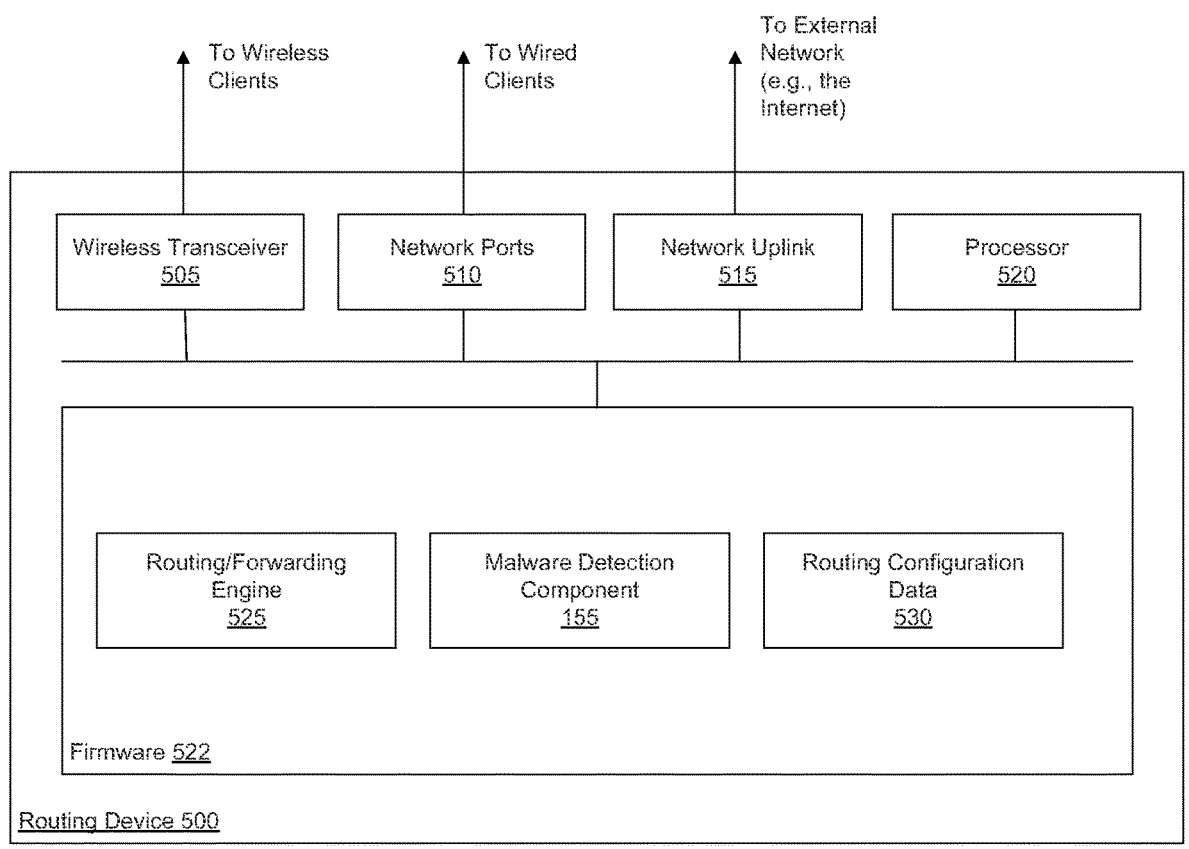
FIG. 5 illustrates an example routing device that includes the malware detection component of FIG. 2, according to one embodiment.

FIG. 5 illustrates an example routing device 500 that includes the malware detection component 155 of FIG. 2, according to one embodiment. The routing device 500 is included to be representative of a network router connecting a variety of computing devices (e.g., devices 110-140 of FIG. 1) over a local network segment as well as an uplink to another network, such as a combined cable or DSL modem, router, and wireless access point.

As shown, the routing device 500 includes a wireless transceiver 505, a set of network ports 510, a network uplink port 515, a processor 520, and a firmware 535, each connected to a bus. The wireless transceiver 505 provides network hardware used to send and receive wireless communication signals to/from computing devices on the local network segment, e.g., devices capable of communicating using one of the 802.11 wireless networking protocols. Similarly, network ports 510 are used to connect computing devices to the routing device using a wired network connection. Network uplink 515 is used to connect the local network segment managed by the routing device 500 to other networks, i.e., to connect the local network segment to an internet service provider.

As shown, the firmware 522 includes a routing and forwarding engine 525, routing configuration 530, and the malware detection component 155. The processor 520 executes the routing and forwarding engine 525 for traffic flows managed by the routing device 500. To do so, the routing and forwarding engine 525 may be configured to forward network packets and/or frames towards a destination based on the routing configuration 530 and information in each packet or frame. Further, in one embodiment, the processor 520 executes the malware detection component 155 to observe the traffic flows managed by the routing and forwarding engine 525, generate signatures for selected traffic flows, and compare the generated signatures to a set of malware signatures, as described above.

Figure 6:
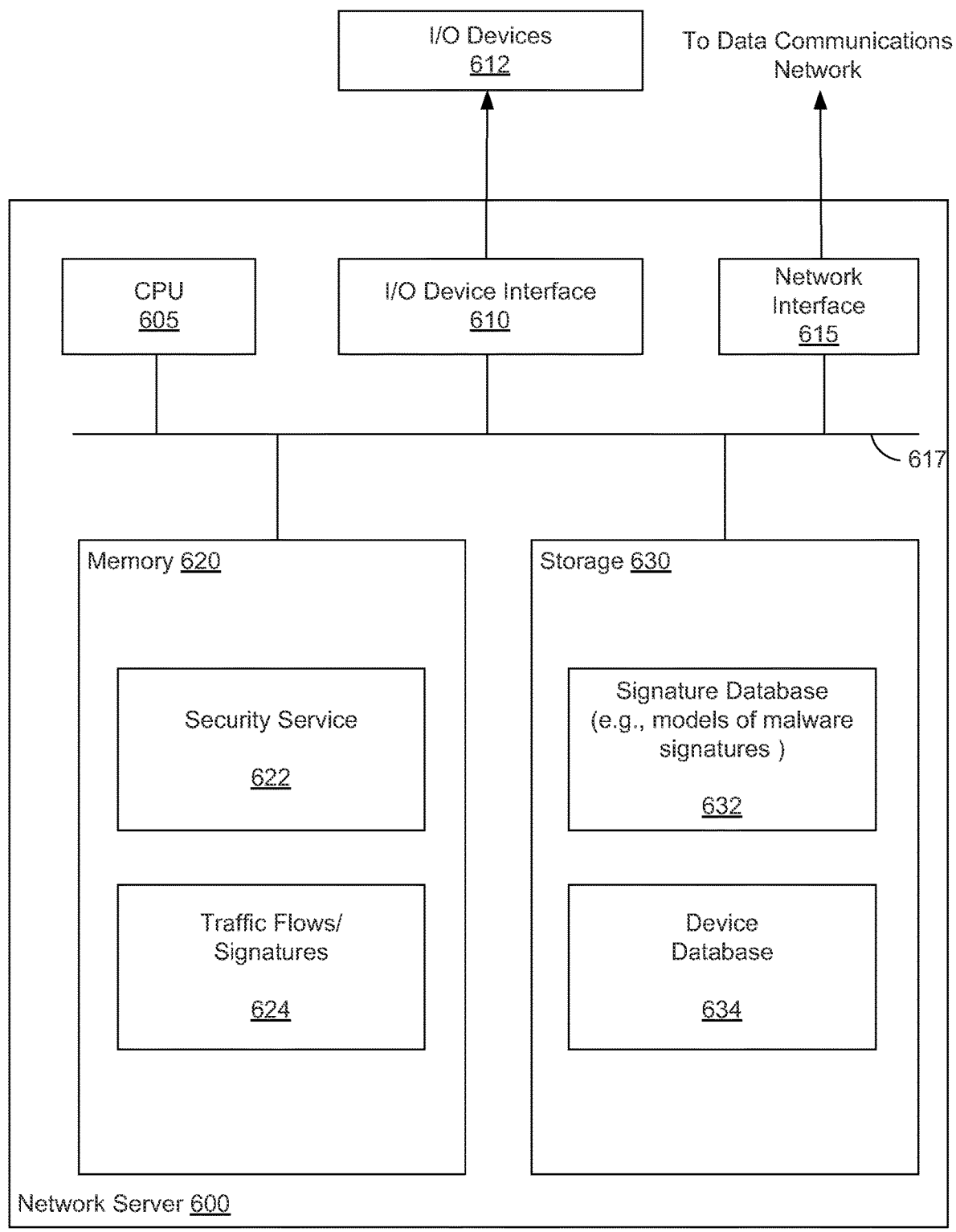
FIG. 6 illustrates an example of a computing server, according to one embodiment.

FIG. 6 illustrates an example of a computing server 600, according to one embodiment. As shown, the computing system 600 includes a central processing unit (CPU) 605, a network interface 615, a memory 620, and storage 630, each connected to a bus 617. The computing system 600 also includes an I/O device interface 610 connecting I/O devices 612 (e.g., keyboard, display and mouse devices) to the computing system 600. Further, in context of this disclosure, the computing elements shown in computing system 600 may correspond to a physical computing system (e.g., a system in a data center) or may be a virtual computing instance executing within a computing cloud.

The CPU 605 retrieves and executes programming instructions stored in the memory 620 as well as stores and retrieves application data residing in the memory 630. The bus 617 is used to transmit programming instructions and application data between the CPU 605, I/O devices interface 610, storage 630, network interface 615, and memory 620. Note, CPU 605 is included to be representative of a single CPU, multiple CPUs, a single CPU having multiple processing cores, and the like. And the memory 620 is generally included to be representative of a random access memory. The storage 630 may be a disk drive storage device. Although shown as a single unit, the storage 630 may be a combination of fixed and/or removable storage devices, such as fixed disc drives, removable memory cards, optical storage, network attached storage (NAS), or a storage area-network (SAN).

Illustratively, the memory 620 includes a security service 622 and a set of traffic flows and signatures 624 and storage 630 includes a signature database 632 and a device database 634. As noted above, the security service 622 may include a set of software applications used to provide the security service to clients. For example, the security service 622 could be implemented using a web-server, application server, database, and related applications. Traffic flows and signatures 624 correspond to signatures received from malware detection components, as well as to traffic flows used to generate malware signatures. For example, in one embodiment, malware signatures may be generated using traffic flows observed on devices known (or at least suspected) to have been compromised by malware. Once generated, such malware signatures may be stored in the signature database 632. Further, in one embodiment, the security service 622 may be configured to compare a candidate signature sent by a malware detection component to the known (or suspected) malware signatures in the signature database 632. In addition, the device database 614 may identify specific computing devices (e.g., by a device ID) as well as types, classes, versions, or revisions of computing devices known (or at least presumed) to be secure or to be vulnerable to malware, as described above.

As described, embodiments presented herein provide techniques for detecting malware on computing devices connected to a local network segment by observing the traffic flows of such devices and generating signatures characterizing such traffic flows. Advantageously, doing so allows instances of malware to be detected on a variety of devices which can be connected to a computing network, but which lack the capability of directly detecting and preventing malware from infecting such devices.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method for detecting a presence of a malware application on a computing device, the method comprising:
   identifying at least a first computing device and a second computing device present on a local network segment of a computing network, wherein at least one of the first computing device and the second computing device is associated with a device type known to not provide malware detection capabilities;
   monitoring, on the local network segment, at least a first traffic flow initiated between the first computing device and the second computing device on the local network segment;
   generating, from the first traffic flow, a signature characterizing the first traffic flow based on at least one of a time or frequency parameter of the first traffic flow; and
   determining, based on the signature, whether the malware application is predicted to be present on the at least one of the first computing device and the second computing device by comparing the signature to a plurality of malware signatures, wherein each of the plurality of malware signatures corresponds to another signature generated for another traffic flow from another computing device matching the device type of the at least one of the first computing device and the second computing device after being compromised by the malware application.

2. The method of claim 1, wherein the signature is compared to a local database of malware signatures on a routing device managing the first traffic flow.

3. The method of claim 1, wherein the signature is generated on a routing device managing the first traffic flow, and wherein the signature is sent by the routing device to an external network security service.

4. The method of claim 1, further comprising:
   upon determining, based on the signature, that the malware application is predicted to be present on the at least one of the first computing device and the second computing device, generating an alert indicating the predicted presence of the malware application on the at least one of the first computing device and the second computing device.

5. The method of claim 4, further comprising:
dropping traffic associated with the first traffic flow.

6. A non-transitory computer-readable storage medium storing instructions, which, when executed on a processor, perform an operation for detecting a presence of a malware application on a computing device, the operation comprising:
identifying at least a first computing device and a second computing device present on a local network segment of a computing network, wherein at least one of the first computing device and the second computing device is associated with a device type determined to not provide malware detection capabilities;
monitoring, on the local network segment, at least a first traffic flow initiated between the first computing device and the second computing device on the local network segment;
generating, from the first traffic flow, a signature characterizing the first traffic flow based on at least one of a time or frequency parameter of the first traffic flow; and
determining, based on the signature, whether the malware application is predicted to be present on the at least one of the first computing device and the second computing device by comparing the signature to a plurality of malware signatures, wherein each of the plurality of malware signatures corresponds to another signature generated for another traffic flow from another computing device matching the device type of the at least one of the first computing device and the second computing device after being compromised by the malware application.

7. The non-transitory computer-readable storage medium of claim 6, wherein the signature is compared to a local database of malware signatures on a routing device managing the first traffic flow and wherein the routing device includes the processor configured to execute the instructions stored on the computer-readable storage medium.

8. The non-transitory computer-readable storage medium of claim 6, wherein the signature is generated on a routing device managing the first traffic flow, wherein the signature is sent by the routing device to an external network security service, and wherein the routing device includes the processor configured to execute the instructions stored on the computer-readable storage medium.

9. The non-transitory computer-readable storage medium of claim 6, wherein the operation further comprises:
upon determining, based on the signature, that the malware application is predicted to be present on the at least one of the first computing device and the second computing device, generating an alert indicating the predicted presence of the malware application on the at least one of the first computing device and the second computing device.

10. The non-transitory computer-readable storage medium of claim 9, wherein the operation further comprises:
dropping traffic associated with the first traffic flow.

11. A system comprising:
a processor; and
a memory hosting a malware detection component, which, when executed on the processor, performs an operation for detecting a presence of a malware application on a computing device, the operation comprising:
identifying at least a first computing device and a second computing device present on a local network segment of a computing network, wherein at least one of the first computing device and the second computing device is associated with a device type determined to not provide malware detection capabilities,
monitoring, on the local network segment, at least a first traffic flow initiated between the first computing device and the second computing device on the local network segment,
generating, from the first traffic flow, a signature characterizing the first traffic flow based on at least one of a time or frequency parameter of the first traffic flow, and
determining, based on the signature, whether the malware application is predicted to be present on the at least one of the first computing device and the second computing device by comparing the signature to a plurality of malware signatures, wherein each of the plurality of malware signatures corresponds to another signature generated for another traffic flow from another computing device matching the device type of the at least one of the first computing device and the second computing device after being compromised by the malware application.

12. The system of claim 11, wherein the system further comprises a routing device managing a plurality of traffic flows for a corresponding plurality of computing devices connected to the local network segment, including the first traffic flow and the at least one of the first computing device and the second computing device, and wherein the signature is compared to a local database of malware signatures on the routing device.

13. The system of claim 11, wherein the system further comprises a routing device managing a plurality of traffic flows for a corresponding plurality of computing devices connected to the local network segment, including the first traffic flow and the at least one of the first computing device and the second computing device, and wherein the signature is sent by the routing device to an external network security service.

14. The system of claim 11, wherein the operation further comprises:
upon determining, based on the signature, that the malware application is predicted to be present on the at least one of the first computing device and the second computing device:
generating an alert indicating the predicted presence of the malware application on the at least one of the first computing device and the second computing device; and
dropping traffic associated with the first traffic flow.

15. The method of claim 1, wherein the signature characterizing the first traffic flow is based on a traffic frequency on the local network segment.

16. The method of claim 1, wherein the signature characterizing the first traffic flow is based on a time stamp of the first traffic flow.

17. The non-transitory computer-readable storage medium of claim 6, wherein the signature characterizing the first traffic flow is based on a traffic frequency on the local network segment.

18. The non-transitory computer-readable storage medium of claim 6, wherein the signature characterizing the first traffic flow is based on a time stamp of the first traffic flow.

19. The system of claim 11, wherein the signature characterizing the first traffic flow is based on a traffic frequency on the local network segment.

20. The system of claim 11, wherein the signature characterizing the first traffic flow is based on a time stamp of the first traffic flow.

\* \* \* \* \*